US012803746B2

(12) United States Patent
Gong et al.

(10) Patent No.: US 12,803,746 B2
(45) Date of Patent: Nov. 17, 2026

(54) RESOURCE CONFIGURATION METHOD AND APPARATUS FOR SOUNDING REFERENCE SIGNALS

(71) Applicant: Huawei Technologies Co., Ltd., Shenzhen (CN)

(72) Inventors: Mingxin Gong, Beijing (CN); Bingyu Qu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 18/596,940

(22) Filed: Mar. 6, 2024

(65) Prior Publication Data

US 2024/0214153 A1 Jun. 27, 2024

Related U.S. Application Data

(63) Continuation of application No. PCT/CN2022/115323, filed on Aug. 27, 2022.

(30) Foreign Application Priority Data

Sep. 7, 2021 (CN) ......................... 202111043657.2

(51) Int. Cl.
*H04L 5/00* (2006.01)

(52) U.S. Cl.
CPC .......... *H04L 5/0051* (2013.01); *H04L 5/0053* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 11,228,463 B2 * | 1/2022 | Wang | H04L 5/0053 |
| 2016/0156395 A1 * | 6/2016 | Lee | H04B 7/0452 370/329 |
| 2017/0127395 A1 * | 5/2017 | Beale | H04W 4/80 |
| 2017/0288834 A1 * | 10/2017 | Yuan | H04L 5/0091 |
| 2018/0212711 A1 * | 7/2018 | Zhu | H04L 1/0026 |
| 2018/0278450 A1 * | 9/2018 | Zarifi | H04W 52/325 |

(Continued)

FOREIGN PATENT DOCUMENTS

CN 110235496 A 9/2019

OTHER PUBLICATIONS

Qualcomm Incorporated "Discussion on SRS enhancement", 3GPP TSG-RAN WG1 Meeting #106-e, e-Meeting, Aug. 16-27, 2021, R1-2107328, total 29 pages.

*Primary Examiner* — Jason D Cardone
(74) *Attorney, Agent, or Firm* — Slater Matsil, LLP

(57) ABSTRACT

Embodiments of this application provide a resource configuration method and apparatus. The method includes: A network device determines K sounding reference signal resource sets corresponding to each of N terminal devices in a first cell, where K sounding reference signal resource sets corresponding to any one of the N terminal devices belong to M sounding reference signal resource sets, and at least X sounding reference signal resource sets in corresponding K sounding reference signal resource sets are different between any two of the N terminal devices. The network device sends configuration information to each terminal device, where the configuration information indicates K sounding reference signal resource sets.

18 Claims, 4 Drawing Sheets

(56) References Cited

U.S. PATENT DOCUMENTS

| | | | | |
|---|---|---|---|---|
| 2020/0044805 | A1* | 2/2020 | Iwai | H04W 52/365 |
| 2022/0232535 | A1* | 7/2022 | Abdelghaffar | H04L 5/0091 |
| 2023/0147579 | A1* | 5/2023 | Go | H04L 1/08 370/329 |
| 2024/0259161 | A1* | 8/2024 | Gao | H04W 76/27 |
| 2025/0338282 | A1* | 10/2025 | Abdelghaffar | H04L 5/0091 |

* cited by examiner

RESOURCE CONFIGURATION METHOD AND APPARATUS FOR SOUNDING REFERENCE SIGNALS

CROSS-REFERENCE TO RELATED APPLICATIONS

This application is a continuation of International Application No. PCT/CN2022/115323, filed on Aug. 27, 2022, which claims priority to Chinese Patent Application No. 202111043657.2, filed on Sep. 7, 2021. The disclosures of the aforementioned applications are hereby incorporated by reference in their entireties.

TECHNICAL FIELD

This application relates to the field of communication technologies, and in particular, to a resource configuration method and apparatus.

BACKGROUND

Currently, in a communication system, a network device may perform, based on a sounding reference signal (SRS) sent by a terminal device, uplink channel estimation and uplink channel quality measurement, calculate a signal to interference plus noise ratio (SINR) of an uplink channel, and so on. In a time division duplex (TDD) scenario, uplink and downlink channels have reciprocity, and the SRS may be further used to obtain a downlink channel coefficient. Before that, the network device needs to configure an SRS resource set for the terminal device, so that the terminal device sends the SRS to the network device on the configured SRS resource set. When a quantity of terminal devices in a cell served by the network device is greater than a quantity of to-be-allocated SRS resource sets, and a plurality of SRS resource sets may be allocated to each terminal device, how the network device configures the SRS resource set for the terminal device is a technical problem being resolved by a person in the art.

SUMMARY

Embodiments of this application disclose a resource configuration method and apparatus, to configure an SRS resource set for a terminal device, and reduce a probability that a collision occurs between terminal devices when the terminal devices send SRSs on corresponding SRS resource sets.

A first aspect of embodiments of this application discloses a resource configuration method, including:

A network device determines K sounding reference signal resource sets corresponding to each of N terminal devices in a first cell, where K sounding reference signal resource sets corresponding to any one of the N terminal devices belong to M sounding reference signal resource sets, and at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1.

The network device sends configuration information to each terminal device, where the configuration information indicates the K sounding reference signal resource sets.

In the foregoing method, the at least X sounding reference signal resource sets in the corresponding K sounding reference signal resource sets are different between any two of the N terminal devices. This can ensure that when simultaneously triggering sounding reference signals, a plurality of terminal devices may select and trigger different sounding reference signal resource sets to send SRSs to the network device, to ensure that the triggering is successful, and reduce a probability that a collision occurs between terminal devices when the terminal devices send SRSs on corresponding SRS resource sets.

In a possible implementation, any two sounding reference signal resource sets in the M sounding reference signal resource sets are configured for a same quantity of times, or a difference between quantities of configuration times of any two sounding reference signal resource sets is less than or equal to 1.

In the foregoing method, any two sounding reference signal resource sets in the M sounding reference signal resource sets are configured for the same quantity of times, or the difference between the quantities of configuration times of any two sounding reference signal resource sets is less than or equal to 1. This can avoid a case in which a sounding reference signal resource set is configured for an excessive quantity of times, and reduce a probability of a triggering failure.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$$C_M^K$$

represents a combinatorial number of M and K.

In the foregoing method, M, K, and N meet the foregoing relationship, and this ensures that sounding reference signal resources can be configured for all the N terminal devices.

In another possible implementation, the method further includes: The network device sends trigger signaling to a first terminal device in the N terminal devices, where the trigger signaling is used to trigger the first terminal device to send a sounding reference signal SRS on one or more sounding reference signal resource sets in K sounding reference signal resource sets corresponding to the first terminal device. The network device receives the SRS from the first terminal device.

A second aspect of embodiments of this application discloses a resource configuration method, including:

A terminal device receives configuration information from a network device, where the configuration information indicates K sounding reference signal resource sets, the terminal device is one of N terminal devices in a first cell, K sounding reference signal resource sets corresponding to any one of the N terminal devices belong to M sounding reference signal resource sets, and the K sounding reference signal resource sets meet the following condition: at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1.

The terminal device sends a sounding reference signal SRS to the network device on one or more sounding reference signal resource sets in the K sounding reference signal resource sets.

In the foregoing method, the at least X sounding reference signal resource sets in the corresponding K sounding reference signal resource sets are different between any two of the N terminal devices. This can ensure that when simultaneously triggering sounding reference signals, a plurality of terminal devices may select and trigger different sounding reference signal resource sets to send SRSs to the network device, to ensure that the triggering is successful, and reduce a probability that a collision occurs between terminal devices when the terminal devices send SRSs on corresponding SRS resource sets.

In a possible implementation, the K sounding reference signal resource sets further meet the following condition: any two sounding reference signal resource sets in the M sounding reference signal resource sets are configured for a same quantity of times, or a difference between quantities of configuration times of any two sounding reference signal resource sets is less than or equal to 1.

In the foregoing method, any two sounding reference signal resource sets in the M sounding reference signal resource sets are configured for the same quantity of times, or the difference between the quantities of configuration times of any two sounding reference signal resource sets is less than or equal to 1. This can avoid a case in which a sounding reference signal resource set is configured for an excessive quantity of times, and reduce a probability of a triggering failure.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$$C_M^K$$

represents a combinatorial number of M and K.

In the foregoing method, M, K, and N meet the foregoing relationship, and this ensures that sounding reference signal resources can be configured for all the N terminal devices.

In another possible implementation, the method further includes: The terminal device receives trigger signaling from the network device, where the trigger signaling is used to trigger sending of the SRS on one or more sounding reference signal resource sets in the K sounding reference signal resource sets.

A third aspect of embodiments of this application discloses a resource configuration apparatus, including a processing unit and a communication unit.

The processing unit is configured to determine K sounding reference signal resource sets corresponding to each of N terminal devices in a first cell, where K sounding reference signal resource sets corresponding to any one of the N terminal devices belong to M sounding reference signal resource sets, and at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1.

The communication unit is configured to send configuration information to each terminal device, where the configuration information indicates the K sounding reference signal resource sets.

In a possible implementation, any two sounding reference signal resource sets in the M sounding reference signal resource sets are configured for a same quantity of times, or a difference between quantities of configuration times of any two sounding reference signal resource sets is less than or equal to 1.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$$C_M^K$$

represents a combinatorial number of M and K.

In another possible implementation, the communication unit is further configured to send trigger signaling to a first terminal device in the N terminal devices, where the trigger signaling is used to trigger the first terminal device to send a sounding reference signal SRS on one or more sounding reference signal resource sets in K sounding reference signal resource sets corresponding to the first terminal device. The communication unit is further configured to receive the SRS from the first terminal device.

For technical effects brought by the third aspect or the possible implementations, refer to the descriptions of the technical effects brought by the first aspect or the corresponding implementations.

A fourth aspect of embodiments of this application discloses a resource configuration apparatus, including a processing unit and a communication unit.

The communication unit is configured to receive configuration information from a network device, where the configuration information indicates K sounding reference signal resource sets, the apparatus is one of N apparatuses in a first cell, K sounding reference signal resource sets corresponding to any one of the N apparatuses belong to M sounding reference signal resource sets, and the K sounding reference signal resource sets meet the following condition: at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1.

The communication unit is configured to send a sounding reference signal SRS to the network device on one or more sounding reference signal resource sets in the K sounding reference signal resource sets.

In a possible implementation, any two sounding reference signal resource sets in the M sounding reference signal resource sets are configured for a same quantity of times, or a difference between quantities of configuration times of any two sounding reference signal resource sets is less than or equal to 1.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$$C_M^K$$

represents a combinatorial number of M and K.

In another possible implementation, the communication unit is further configured to receive trigger signaling from the network device, where the trigger signaling is used to trigger sending of the SRS on one or more sounding reference signal resource sets in the K sounding reference signal resource sets.

For technical effects brought by the fourth aspect or the possible implementations, refer to the descriptions of the technical effects brought by the second aspect or the corresponding implementations.

A fifth aspect of embodiments of this application discloses a resource configuration apparatus. The apparatus includes at least one processor and a communication interface, and the at least one processor invokes a computer program or instructions stored in a memory, to perform the following operations: determining K sounding reference signal resource sets corresponding to each of N terminal devices in a first cell, where K sounding reference signal resource sets corresponding to any one of the N terminal devices belong to M sounding reference signal resource sets, and at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1; and sending configuration information to each terminal device through the communication interface, where the configuration information indicates the K sounding reference signal resource sets.

In a possible implementation, any two sounding reference signal resource sets in the M sounding reference signal resource sets are configured for a same quantity of times, or a difference between quantities of configuration times of any two sounding reference signal resource sets is less than or equal to 1.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$$C_M^K$$

represents a combinatorial number of M and K.

In another possible implementation, the processor is further configured to: send trigger signaling to a first terminal device in the N terminal devices through the communication interface, where the trigger signaling is used to trigger the first terminal device to send a sounding reference signal SRS on one or more sounding reference signal resource sets in K sounding reference signal resource sets corresponding to the first terminal device; and receive the SRS from the first terminal device through the communication interface.

For technical effects brought by the fifth aspect or the possible implementations, refer to the descriptions of the technical effects brought by the first aspect or the corresponding implementations.

A sixth aspect of embodiments of this application discloses a resource configuration apparatus. The apparatus includes at least one processor and a communication interface, and the at least one processor invokes a computer program or instructions stored in a memory, to perform the following operations: receiving configuration information from a network device through the communication interface, where the configuration information indicates K sounding reference signal resource sets, K sounding reference signal resource sets corresponding to any one of N apparatuses belong to M sounding reference signal resource sets, a quantity of sounding reference signal resource sets corresponding to a first cell is M, and the K sounding reference signal resource sets meet the following condition: at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1; and sending a sounding reference signal SRS to the network device on one or more sounding reference signal resource sets in the K sounding reference signal resource sets through the communication interface.

In a possible implementation, the K sounding reference signal resource sets further meet the following condition: any two sounding reference signal resource sets in the M sounding reference signal resource sets are configured for a same quantity of times, or a difference between quantities of configuration times of any two sounding reference signal resource sets is less than or equal to 1.

In a possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$C_M^K$ represents a combinatorial number of M and K.

In another possible implementation, the processor is further configured to receive trigger signaling from the network device through the communication interface, where the trigger signaling is used to trigger sending of the SRS on one or more sounding reference signal resource sets in the K sounding reference signal resource sets.

For technical effects brought by the sixth aspect or the possible implementations, refer to the descriptions of the technical effects brought by the second aspect or the corresponding implementations.

A seventh aspect of embodiments of this application discloses a chip system. The chip system includes at least one processor and a communication interface, and the at least one processor is configured to execute a computer program or instructions, to implement the method according to any one of the foregoing aspects.

An eighth aspect of embodiments of this application discloses a computer-readable storage medium. The computer-readable storage medium stores computer instructions, and when the computer instructions are run on a processor, the method according to any one of the foregoing aspects is implemented.

A ninth aspect of embodiments of this application discloses a computer program product. The computer program product includes computer program code, and when the computer program code is run on a computer, the method according to any one of the foregoing aspects is implemented.

BRIEF DESCRIPTION OF THE DRAWINGS

The following describes the accompanying drawings used in embodiments of this application.

DETAILED DESCRIPTION OF ILLUSTRATIVE EMBODIMENTS

The following describes embodiments of this application with reference to the accompanying drawings in embodiments of this application.

The technical solutions provided in this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a $5^{th}$ generation (5G) mobile communication system, and a new radio access technology (NR). The 5G mobile communication system may be non-standalone (NSA) and/or standalone (SA).

The technical solutions provided in this application may be further applied to a machine type communication (MTC) network, a machine-to-machine communication long term evolution technology (LTE-M) network, a device-to-device (D2D) network, a machine-to-machine (M2M) network, an internet of things (IoT) network, or another network. The IoT network may include, for example, an internet of vehicles. Communication modes in an internet of vehicles system are collectively referred to as vehicle to X (V2X, X can represent anything). For example, the V2X may include vehicle to vehicle (V2V) communication, vehicle to infrastructure (V2I) communication, vehicle to pedestrian (V2P) communication, or vehicle to network (V2N) communication.

The technical solutions provided in this application may be further applied to a future communication system, for example, a sixth generation mobile communication system. This is not limited in this application.

Figure 1:
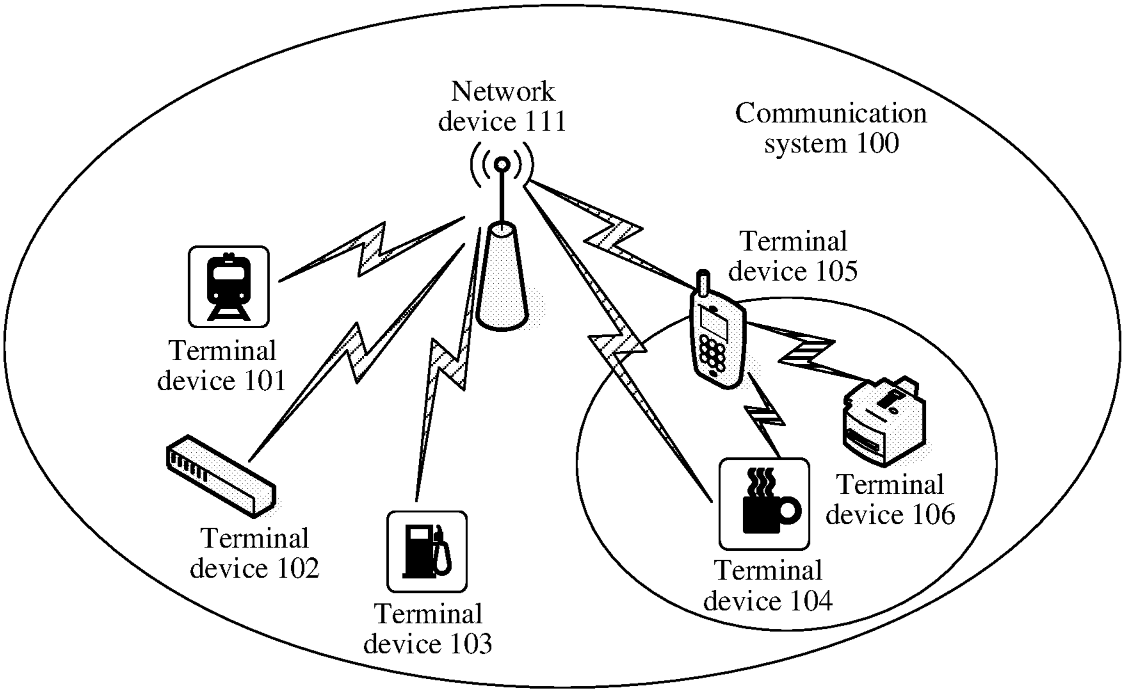
FIG. 1 is a schematic diagram of a communication system according to an embodiment of this application.

FIG. 1 is a schematic diagram of a structure of a communication system 100 applicable to embodiments of this application. The communication system 100 includes a network device 111, a terminal device 101, a terminal device 102, a terminal device 103, a terminal device 104, a terminal device 105, and a terminal device 106. It should be understood that the communication system 100 may include more network devices or more or fewer terminal devices. The network device and the terminal device may be hardware, may be software obtained through functional division, or may be a combination thereof. The network device and the terminal device may communicate with each other by using another device or network element. In the system, the network device 11 may perform data transmission with a plurality of terminal devices, that is, the network device 11 sends downlink data to the terminal device 101 to the terminal device 106. Certainly, the terminal device 101 to the terminal device 106 may also send uplink data to the network device 11. In addition, the terminal device 104, the terminal device 105, and the terminal device 106 may alternatively form a communication system. In the system, the network device 11 may send downlink data to the terminal device 101, the terminal device 102, and the terminal device 105, and then the terminal device 105 sends the downlink data to the terminal device 104 or the terminal device 106. The method in embodiments of this application may be applied to the communication system 100 shown in FIG. 1.

(1) The terminal device includes user equipment (UE) and includes a device that provides a voice and/or data connectivity for a user. Specifically, the terminal device includes a device that provides a voice for a user, includes a device that provides data connectivity for a user, or includes a device that provides a voice and data connectivity for a user. For example, a handheld device with a wireless connection function or a processing device connected to a wireless modem may be included. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an internet of things (IoT) terminal device, light user equipment (light UE), reduced capability user equipment (REDCAP UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device such as a personal communication service (PCS) phone, a cordless telephone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that are dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as in-vehicle terminal devices. For example, the in-vehicle terminal devices are also referred to as on-board units (on-board units, OBUs).

In embodiments this application, the terminal device may further include a relay (relay). Alternatively, it may be understood that all devices that can perform data communication with a base station may be considered as terminal devices.

In embodiments of this application, an apparatus configured to implement a function of the terminal device may be a terminal device, or may be an apparatus, for example, a chip system, that can support the terminal device in implementing the function. The apparatus may be installed in the terminal device. In embodiments of this application, the chip system may include a chip, or may include a chip and another discrete component. In the technical solutions provided in embodiments of this application, an example in which the apparatus configured to implement the function of the terminal is the terminal device is used to describe the technical solutions provided in embodiments of this application.

(2) The network device includes, for example, an access network (access network, AN) device such as a base station (for example, an access point), and may be a device that communicates with a wireless terminal device through an air interface in one or more cells in an access network. Alternatively, the network device is, for example, a road side unit (road side unit, RSU) in a vehicle-to-everything (vehicle-to-everything, V2X) technology. The base station may be configured to perform mutual conversion between a received over-the-air frame and an IP packet, to serve as a router between the terminal device and a remaining part of the access network. The remaining part of the access network may include an IP network. The RSU may be a fixed infrastructure entity that supports a V2X application, and may exchange a message with another entity that supports the V2X application. The network device may further coordinate attribute management of the air interface. For example, the network device may include an evolved NodeB (NodeB, eNB, or e-NodeB) in a long term evolution (LTE) system or a long term evolution-advanced (LTE-A) system, may include a next generation NodeB (gNB) in a $5^{th}$ generation (5G) mobile communication technology NR system (also briefly referred to as an NR system), or may include a central unit (CU) and a distributed unit (DU) in a cloud radio access network (Cloud RAN) system. This is not limited in embodiments of this application.

The network device may further include a core network device. The core network device includes, for example, an access and mobility management function (AMF), a user plane function (UPF), or a session management function (SMF).

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is the network device is used to describe the technical solutions provided in embodiments of this application.

First, some terms in this application are explained and described, to facilitate understanding of a person skilled in the art.

A reference signal (RS) may also be referred to as a "pilot" signal, and is a known signal that is provided by a transmit end to a receive end and that is used for channel estimation or sounding. Reference signals are classified into uplink reference signals and downlink reference signals.

The uplink reference signal is a signal sent by a terminal device to a network device, where the transmit end is the terminal device, and the receive end is the network device. The uplink reference signal is used for two purposes: uplink channel estimation (used by the network device to perform coherent demodulation and detection or used for calculating precoding) and uplink channel quality measurement. The uplink reference signal may include a demodulation reference signal (DMRS) and a sounding reference signal (SRS). The SRS may be used by the network device to perform uplink channel quality estimation and channel selection, and calculate a signal to noise interference ratio (SINR) of an uplink channel, or may be used by the network device to obtain an uplink channel coefficient. In a TDD scenario, uplink and downlink channels have reciprocity, and the SRS may be further used by the network device to obtain a downlink channel coefficient. The network device may estimate, based on the SRS, the uplink/downlink channel coefficient, which may be used to determine an uplink/downlink precoding matrix, to increase an uplink/downlink transmission rate and increase a system capacity.

When system bandwidth is large, because transmit power of the terminal device is limited, the terminal device usually cannot send an SRS of full bandwidth on one symbol, and needs to send the SRS on a plurality of symbols through frequency hopping, to obtain channel information of the full bandwidth. Currently, in an NR protocol, an SRS can be sent on a plurality of symbols through frequency hopping.

In an existing protocol, four usages of the SRS are defined, and are respectively antenna switching, codebook, noncodebook, and beam management. The antenna switching is used in the TDD scenario, the uplink and downlink channels have reciprocity, and the antenna switching indicates that the SRS is used to obtain the downlink channel coefficient. Embodiments of this application are mainly applied to the SRS used for the antenna switching.

Antenna switching: The terminal device transmits SRSs on a plurality of antennas alternately, and the network device may determine channel information corresponding to the plurality of antennas through the alternate transmitting. Common antenna switching specifications include 1T2R, 1T4R, 2T2R, and the like. T herein refers to a transmit antenna (transmitter), and is a quantity of transmit antennas on which the terminal device can simultaneously send SRSs to the network device. R refers to a receive antenna (receiver), and is a quantity of antennas on which SRSs are sent alternately.

For a TDD system, uplink and downlink channel reciprocity may be used. The network device may obtain channel state information (CSI) of a downlink channel by using an SRS. For the terminal device, a quantity of transmit antennas and a quantity of receive antennas may be unequal, and are determined by a capability of the terminal device. Commonly, 1T2R, 1T4R, and 2T4R are used. In this case, to obtain the CSI of the downlink channel, the network device may enable the terminal device to perform switching between different antenna ports to send the SRS. 1T2R is used as an example. The network device may send configuration information to the terminal device, and configure an SRS resource set. The resource set includes two SRS resources: resource 1 and resource 2. Each of the SRS resources includes one SRS port: port 1 or port 2. Resource 1 includes port 1, and resource 2 includes port 2. The two SRS resources occupy different time domain symbols. After receiving the configuration information and receiving trigger signaling from the network device, the terminal device alternately uses transmit antenna 1 to send the SRS on port 1 corresponding to resource 1, and uses transmit antenna 2 to send the SRS on port 2 corresponding to resource 2. A quantity of transmit antennas and a quantity of receive antennas of the terminal device may alternatively be equal. In this case, the terminal device does not need to perform antenna switching to send an SRS (but in this case, the SRS is also used for the antenna switching). 2T2R is used as an example. The network device may configure an SRS resource set for the terminal device, and the SRS resource set includes one SRS resource, referred to as resource 3 for short. The one SRS resource includes two SRS ports. After receiving configuration information and receiving trigger signaling from the network device, the terminal device uses transmit antenna 1 and transmit antenna 2 to send the SRS on the two SRS ports corresponding to resource 3.

Figure 2:
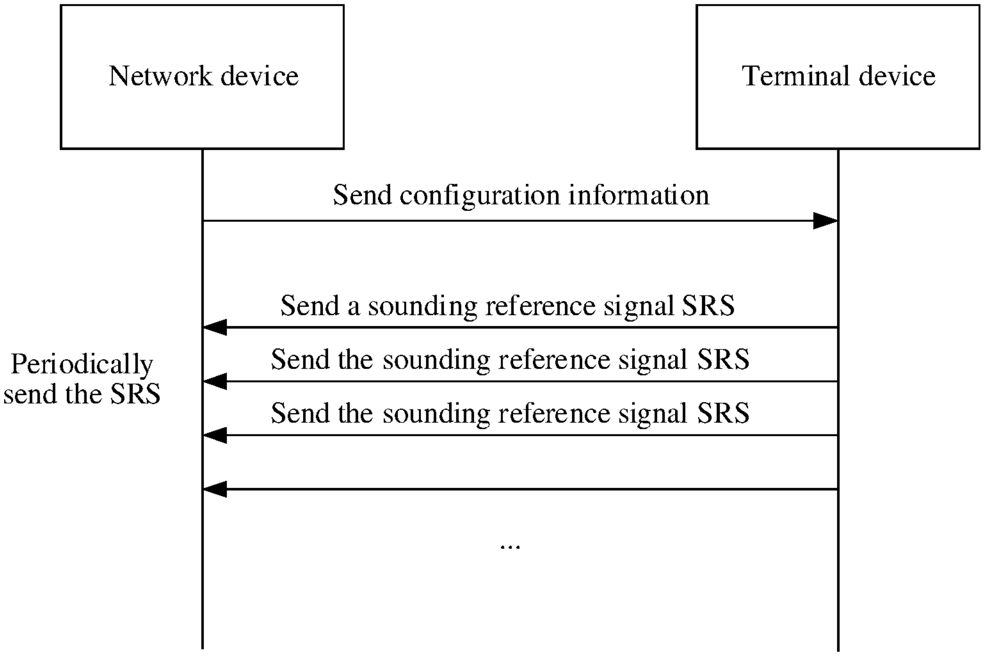
FIG. 2 is a schematic diagram of a P-SRS according to an embodiment of this application.
Figure 3:
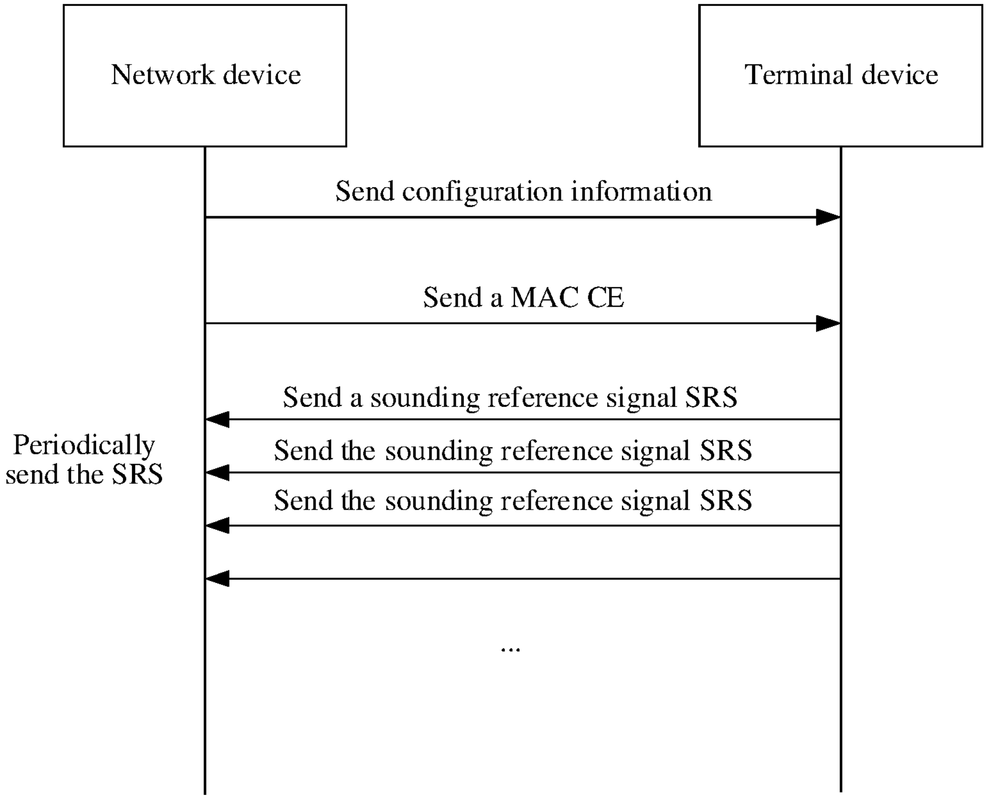
FIG. 3 is a schematic diagram of an SP-SRS according to an embodiment of this application.
Figure 4:
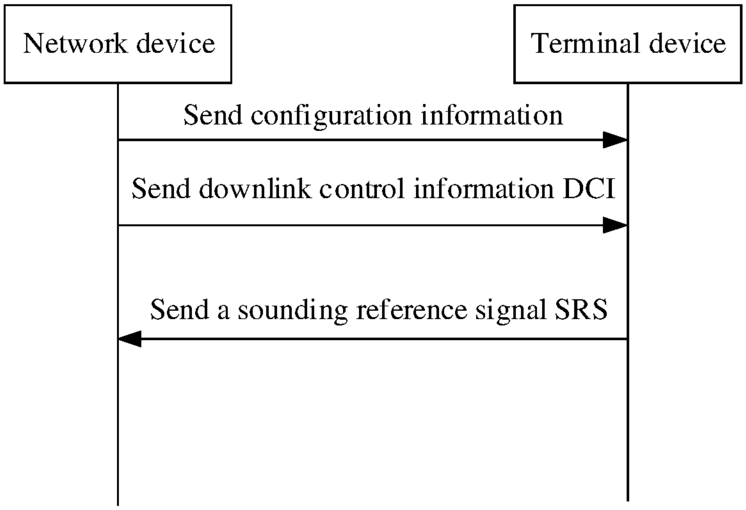
FIG. 4 is a schematic diagram of an AP-SRS according to an embodiment of this application.

The SRS may be classified into a periodic sounding reference signal (P-SRS), a semi-persistent sounding reference signal (SP-SRS), and an aperiodic sounding reference signal (AP-SRS). FIG. 2 is a schematic diagram of the P-SRS. The P-SRS is configured by using radio resource control (RRC) and is periodically sent. After configuration, the P-SRS does not need to be triggered. The network device sends configuration information to the terminal device, where the configuration information is used to configure a periodicity for sending the SRS by the terminal device to the network device, and the configuration information does not need to be activated. Then, the terminal device periodically sends the SRS to the network device. Correspondingly, the network device periodically receives the SRS. FIG. 3 is a schematic diagram of the SP-SRS. After the SP-SRS is configured by using RRC, the SP-SRS cannot be directly used, and needs to be further triggered. The SP-SRS may be triggered by using a medium access control control element (MAC CE). After the triggering, the terminal device periodically sends the SRS to the network device. After the terminal device receives deactivation signaling from the network device, the terminal device stops sending the SRS to the network device. FIG. 4 is a schematic diagram of the AP-SRS. After the AP-SRS is configured by using RRC, the AP-SRS cannot be directly used, and needs to be further triggered. The AP-SRS may be triggered by using downlink control information (DCI). After the triggering, the terminal device sends the SRS to the network device once.

An application scenario of the SP-SRS is as follows. The network device sends configuration information to the terminal device, where the configuration information is used to configure a semi-persistent SRS resource set with a short periodicity. When a data packet of the terminal device is large, the network device may send activation signaling to the terminal device, where the activation signaling is used to activate the semi-persistent SRS resource set, to reduce an SRS periodicity and ensure accuracy of channel estimation. When the terminal device has no data packet or has a small data packet, the network device may send deactivation signaling to the terminal device, where the deactivation signaling is used to deactivate the semi-persistent SRS resource set, to reduce SRS overheads. However, in a cell, there are a large quantity of RRC connected users, that is, terminal devices, and usually there may be hundreds of terminal devices. However, because uplink resources are limited, and a quantity of available semi-persistent SRS resource sets is far less than a quantity of the terminal devices, overlapping semi-persistent SRS resource sets (where the overlapping means that semi-persistent SRS resource sets configured for the terminal devices occupy a same time frequency resource and use a same SRS sequence) need to be allocated to a plurality of terminal devices. However, when the terminal devices need to simultaneously trigger the SP-SRS, that is, when all the terminal devices receive trigger signaling from the network device, and the terminal devices need to simultaneously send the SRS to the network device, a collision between the terminal devices is caused. Because all or some of the semi-persistent SRS resource sets corresponding to the terminal devices occupy a same adaptation resource, the triggering fails, that is, the sending of the SRS to the network device fails. For an SRS used for antenna switching, an existing protocol specifies that at most one semi-persistent SRS resource set can be configured for each terminal. In this case, a probability of a collision between terminal devices is high. A method for resolving the high collision probability is to configure a plurality of semi-persistent SRS resource sets for each terminal, to reduce the collision between different terminal devices.

Currently, the network device configures semi-persistent SRS resource sets for terminal devices in a cell in a sequential allocation manner. For example, a quantity of available semi-persistent SRS resource sets in a cell is 8, a quantity of semi-persistent SRS resource sets that can be configured for each terminal device is 2, and a quantity of terminal devices in the cell is 24. The quantity 24 of the terminal devices in the cell is far greater than the quantity 8 of the available semi-persistent SRS resource sets in the cell. In this case, semi-persistent SRS resource sets allocated by the network device to the 24 terminal devices in the cell are specifically shown in Table 1. The 24 terminal devices in the cell may be referred to as UE 1 to UE 24 for short. According to Table 1, every six terminal devices are determined as one periodicity. To be specific, sequence numbers of semi-persistent SRS resource sets allocated to UE 1, UE 5, UE 9, UE 13, UE 17 and UE 21 are 1 and 2, sequence numbers of semi-persistent SRS resource sets allocated to UE 2, UE 6, UE 10, UE 14, UE 18 and UE 22 are 3 and 4, and so on.

TABLE 1

| | UE 1 | UE 2 | UE 3 | UE 4 | UE 5 | UE 6 | UE 7 | UE 8 |
|---|---|---|---|---|---|---|---|---|
| Sequence number of the 1st resource set | 1 | 3 | 5 | 7 | 1 | 3 | 5 | 7 |
| Sequence number of the 2nd resource set | 2 | 4 | 6 | 8 | 2 | 4 | 6 | 8 |

| | UE 9 | UE 10 | UE 11 | UE 12 | UE 13 | UE 14 | UE 15 | UE 16 |
|---|---|---|---|---|---|---|---|---|
| Sequence number of the 1st resource set | 1 | 3 | 5 | 7 | 1 | 3 | 5 | 7 |
| Sequence number of the 2nd resource set | 2 | 4 | 6 | 8 | 2 | 4 | 6 | 8 |

| | UE 17 | UE 18 | UE 19 | UE 20 | UE 21 | UE 22 | UE 23 | UE 24 |
|---|---|---|---|---|---|---|---|---|
| Sequence number of the 1st resource set | 1 | 3 | 5 | 7 | 1 | 3 | 5 | 7 |
| Sequence number of the 2nd resource set | 2 | 4 | 6 | 8 | 2 | 4 | 6 | 8 |

According to the allocation method, the sequence numbers of the semi-persistent SRS resource sets allocated to UE 1, UE 5, UE 9, UE 13, UE 17 and UE 21 are 1 and 2. When more than two terminal devices in these terminal devices receive trigger signaling from the network device, and the trigger signaling is used to trigger the semi-persistent SRS resource sets, the more than two terminal devices need to send SRSs to the network device by using the semi-persistent SRS resource sets whose sequence numbers are 1 and 2. As a result, a collision occurs. For example, three terminal devices, namely, UE 1, UE 5, and UE 9, all receive trigger signaling from the network device. The trigger signaling activates semi-persistent SRS resource sets, but only the semi-persistent SRS resource sets whose sequence numbers are 1 and 2 are available. If the three terminal devices are triggered simultaneously, two terminal devices use a same semi-persistent SRS resource set, causing large interference; or if only two terminal devices are triggered, triggering of the other terminal device fails. Therefore, to resolve the foregoing problem, embodiments of this application provide the following solutions.

Figure 5:
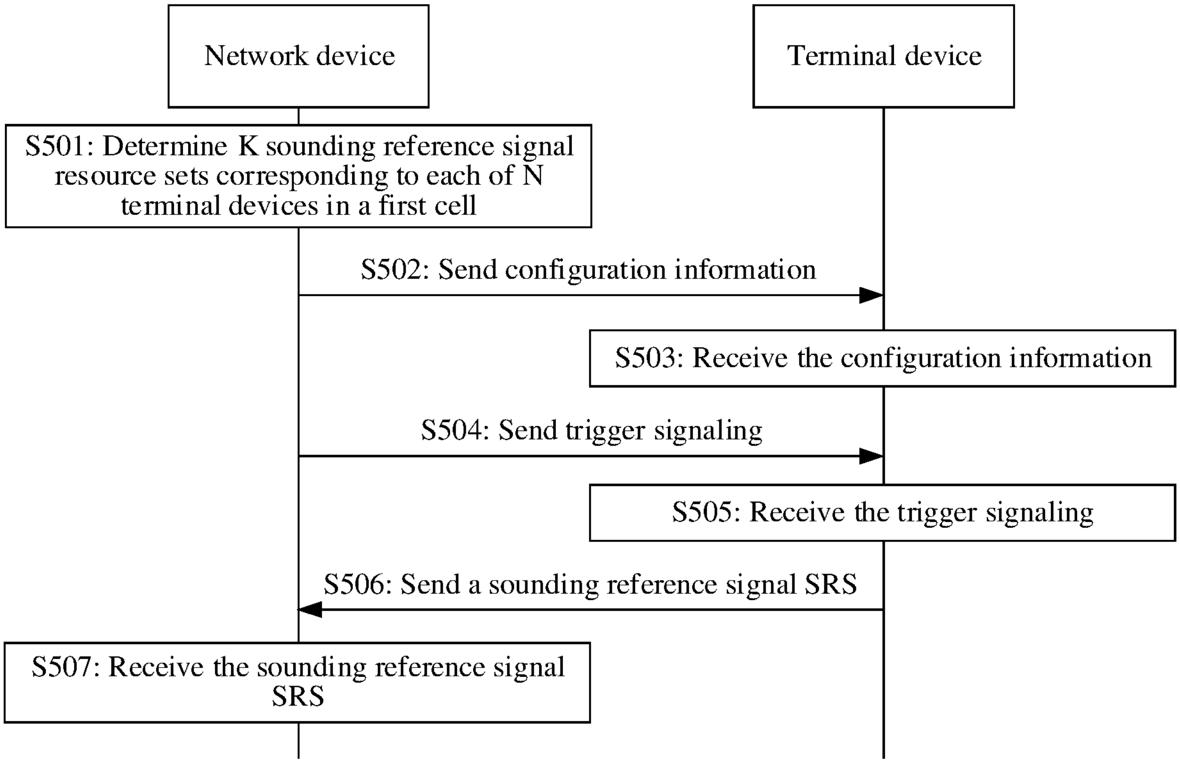
FIG. 5 is a schematic diagram of a resource configuration method according to an embodiment of this application.

FIG. 5 shows a resource configuration method according to an embodiment of this application. The method includes but is not limited to the following steps.

Step S501: A network device determines K sounding reference signal resource sets corresponding to each of N terminal devices in a first cell.

Specifically, K sounding reference signal resource sets corresponding to any one of the N terminal devices belong to M sounding reference signal resource sets, the M sounding reference signal resource sets are sounding reference signal resource sets corresponding to the first cell, and at least X sounding reference signal resource sets in corresponding K sounding reference signal resource sets are different between any two of the N terminal devices. In addition, any two sounding reference signal resource sets in the M sounding reference signal resource sets are configured for a same quantity of times, or a difference between quantities of configuration times of any two sounding reference signal resource sets is less than or equal to 1. M is less than N, K is less than M, M, N, and K are all integers greater than or equal to 0, and X is an integer greater than or equal to 1. X and K may meet the following relationship: X=K−1. M, K and N meet the following relationship:

$$C_M^K \geq N,$$

where $C_M^K$ represents a combinatorial number of M and K.

Specifically, the sounding reference signal resource sets corresponding to the first cell may be available sounding reference signal resource sets in the first cell, to-be-allocated sounding reference signal resource sets in the first cell, to-be-used sounding reference signal resource sets in the first cell, or the like. The M sounding reference signal resource sets may mean that a quantity of all sounding reference signal resource sets that can be used in the first cell is M, or may mean that a quantity of some sounding reference signal resource sets that can be used in the first cell is M. This is not limited herein. The M sounding reference signal resource sets may be semi-persistent SRS resource sets used for antenna switching. In addition to the M resource sets, the network device may further configure, for the terminal device, a resource set for another purpose, or a resource set of another time domain type, for example, a periodic SRS resource set. This is not limited herein. The N terminal devices in the first cell may mean that a quantity of all available terminal devices in the first cell is N, or may mean that a quantity of some available terminal devices in the first cell is N. This is not limited herein.

It should be noted that, in this embodiment of this application, the network device allocates an SRS resource set to the terminal device, and an example in which the SRS resource set is a smallest allocation unit is used for description. In a specific implementation process, an SRS resource may alternatively be used as a smallest allocation unit, that is, the network device allocates the SRS resource to the terminal device. In other words, in this embodiment of this application, the SRS resource set may be replaced with the SRS resource, and a sequence number of the SRS resource set may be replaced with a sequence number of the SRS resource. For details about using the SRS resource as the smallest allocation unit, refer to using the SRS resource set as the smallest allocation unit. Details are not described herein again.

Specifically, the sounding reference signal resource set includes a semi-persistent sounding reference signal resource set (SP-SRS resource set) or an aperiodic sounding reference signal resource set (AP-SRS resource set), that is, does not include a periodic sounding reference signal resource set (P-SRS resource set).

Specifically, because each terminal device corresponds to K sounding reference signal resource sets, that the at least X sounding reference signal resource sets in the corresponding K sounding reference signal resource sets are different between any two of the N terminal devices may mean that at least X sounding reference signal resource sets in the K sounding reference signal resource sets corresponding to any one of the N terminal devices are different from K sounding reference signal resource sets corresponding to any other terminal device. That each terminal device corresponds to the K sounding reference signal resource sets may mean that the K sounding reference signal resource sets may be configured for or allocated to each terminal device. A quantity of sounding reference signal resource sets that can be configured for each terminal device may be determined based on a capability of each terminal device, or may be predefined in a protocol.

In an example, it is assumed that a quantity N of the terminal devices in the first cell is 24, and a quantity M of the sounding reference signal resource sets corresponding to the first cell is 8, that is, a quantity of available sounding reference signal resource sets in the first cell is 8. Each terminal device corresponds to two sounding reference signal resource sets. In other words, two sounding reference signal resource sets may be configured for each terminal device. In this case, two sounding reference signal resource sets that correspond to each of the 24 terminal devices in the first cell and that are determined by the network device are specifically shown in Table 2. The 24 terminal devices in the cell may be referred to as UE 1 to UE 24 for short.

TABLE 2

| | UE 1 | UE 2 | UE 3 | UE 4 | UE 5 | UE 6 | UE 7 | UE 8 |
|---|---|---|---|---|---|---|---|---|
| Sequence number of the 1st resource set | 1 | 1 | 1 | 1 | 1 | 1 | 8 | 8 |
| Sequence number of the 2nd resource set | 2 | 3 | 4 | 5 | 6 | 7 | 2 | 3 |

| | UE 9 | UE 10 | UE 11 | UE 12 | UE 13 | UE 14 | UE 15 | UE 16 |
|---|---|---|---|---|---|---|---|---|
| Sequence number of the 1st resource set | 8 | 8 | 8 | 8 | 2 | 2 | 2 | 2 |
| Sequence number of the 2nd resource set | 4 | 5 | 6 | 7 | 3 | 4 | 5 | 6 |

| | UE 17 | UE 18 | UE 19 | UE 20 | UE 21 | UE 22 | UE 23 | UE 24 |
|---|---|---|---|---|---|---|---|---|
| Sequence number of the 1st resource set | 7 | 7 | 7 | 7 | 3 | 3 | 6 | 6 |
| Sequence number of the 2nd resource set | 3 | 4 | 5 | 6 | 4 | 5 | 4 | 5 |

It can be learned from Table 2 that, at least one sounding reference signal resource set in two corresponding sounding reference signal resource sets is different between any two of the 24 terminal devices. In an example, sequence numbers of two sounding reference signal resource sets corresponding to UE 1 are 1 and 2, and sequence numbers of two sounding reference signal resource sets corresponding to UE 3 are 1 and 4. A sounding reference signal resource set whose sequence number is 2 is different from a sounding reference signal resource set whose sequence number is 4. In an example, sequence numbers of two sounding reference signal resource sets corresponding to UE 1 are 1 and 2, and sequence numbers of two sounding reference signal resource sets corresponding to UE 22 are 3 and 5. The two sounding reference signal resource sets whose sequence numbers are 1 and 2 are different from the two sounding reference signal resource sets whose sequence numbers are 3 and 5.

It can be learned from Table 2 that, a sounding reference signal resource set whose sequence number is 1 is configured for six times, a sounding reference signal resource set whose sequence number is 2 is configured for six times, and so on. Any two of the eight sounding reference signal resource sets are configured for a same quantity of times.

In an example, it is assumed that a quantity N of the terminal devices in the first cell is 23, and a quantity M of the sounding reference signal resource sets corresponding to the first cell is 8, that is, a quantity of available sounding reference signal resource sets in the first cell is 8. Each terminal device corresponds to two sounding reference signal resource sets. In other words, two sounding reference signal resource sets may be configured for each terminal device. In this case, two sounding reference signal resource sets that correspond to each of the 23 terminal devices in the first cell and that are determined by the network device are specifically shown in Table 2. The 23 terminal devices in the cell may be referred to as UE 1 to UE 23 for short.

TABLE 3

| | UE 1 | UE 2 | UE 3 | UE 4 | UE 5 | UE 6 | UE 7 | UE 8 |
|---|---|---|---|---|---|---|---|---|
| Sequence number of the 1st resource set | 1 | 1 | 1 | 1 | 1 | 1 | 8 | 8 |
| Sequence number of the 2nd resource set | 2 | 3 | 4 | 5 | 6 | 7 | 2 | 3 |
| | UE 9 | UE 10 | UE 11 | UE 12 | UE 13 | UE 14 | UE 15 | UE 16 |
| Sequence number of the 1st resource set | 8 | 8 | 8 | 8 | 2 | 2 | 2 | 2 |
| Sequence number of the 2nd resource set | 4 | 5 | 6 | 7 | 3 | 4 | 5 | 6 |
| | UE 17 | UE 18 | UE 19 | UE 20 | UE 21 | UE 22 | UE 23 | |
| Sequence number of the 1st resource set | 7 | 7 | 7 | 7 | 3 | 3 | 6 | |
| Sequence number of the 2nd resource set | 3 | 4 | 5 | 6 | 4 | 5 | 4 | |

It can be learned from Table 3 that, at least one sounding reference signal resource set in two corresponding sounding reference signal resource sets is different between any two of the 23 terminal devices. In an example, sequence numbers of two sounding reference signal resource sets corresponding to UE 1 are 1 and 2, and sequence numbers of two sounding reference signal resource sets corresponding to UE 3 are 1 and 4. A sounding reference signal resource set whose sequence number is 2 is different from a sounding reference signal resource set whose sequence number is 4.

It can be learned from Table 3 that, a sounding reference signal resource set whose sequence number is 1 is configured for six times, a sounding reference signal resource set whose sequence number is 2 is configured for six times, a sounding reference signal resource set whose sequence number is 3 is configured for six times, a sounding reference signal resource set whose sequence number is 4 is configured for six times, a sounding reference signal resource set whose sequence number is 5 is configured five times, and a sounding reference signal resource set whose sequence number is 6 is configured for five times. Any two sounding reference signal resource sets in the eight sounding reference signal resource sets are configured for a same quantity of times, or a difference between quantities of configuration times of any two sounding reference signal resource sets is less than or equal to 1

A sounding reference signal resource set corresponding to any one of the N terminal devices may occupy a same time-frequency resource as that of a sounding reference signal resource set corresponding to any other terminal device, and sequence numbers of the sounding reference signal resource sets may be different. According to the foregoing embodiment, in the examples, if sequence numbers of sounding reference signal resource sets are different, the sounding reference signal resource sets occupy different time-frequency resources; or if sounding reference signal resource sets have a same sequence number, the sounding reference signal resource sets occupy a same time-frequency resource. For example, Table 3 is used as an example. Sequence numbers of two sounding reference signal resource sets corresponding to UE 1 are 1 and 2, and sequence numbers of two sounding reference signal resource sets corresponding to UE 3 are 1 and 4. A sounding reference signal resource set whose sequence number is 1 and a sounding reference signal resource set whose sequence number is 1 occupy a same time-frequency resource, and a sounding reference signal resource set whose sequence number is 2 and a sounding reference signal resource set whose sequence number is 4 occupy different time-frequency resources.

In other words, that two sounding reference signal resource sets are the same means that time-frequency positions of SRSs indicated by the two sounding reference signal resource sets are the same, and used reference signal sequences are the same, that is, the two sounding reference signal resource sets are the same in three dimensions: time domain, frequency domain, and code domain. This does not mean that the two sounding reference signal resource sets have same parameters such as sequence number IDs and power control, and does not mean that the two sounding reference signal resource sets are configured by using same configuration information. The sounding reference signal resource set sequence numbers in Table 2 and Table 3 are merely used to distinguish between SRSs that occupy different time-frequency-code resources.

Step S502: The network device sends configuration information to each terminal device.

Specifically, the configuration information indicates the K sounding reference signal resource sets. When the sounding reference signal resource set is a semi-persistent sounding reference signal resource set, the configuration information is further used to configure parameters such as a periodicity for sending an SRS by the terminal device to the network device, a time-frequency position, a sequence, and power control. The configuration information sent by the network device to each terminal device may be the same or may be different.

In an example, Table 3 is used as an example. The network device sends configuration information to UE 1, where the configuration information indicates that sequence numbers of sounding reference signal resource sets corresponding to UE 1 are 1 and 2. The network device sends configuration information to UE 3, where the configuration information indicates that sequence numbers of sounding reference signal resource sets corresponding to UE 3 are 1 and 4.

Step S503: The terminal device receives the configuration information from the network device.

Step S504: The network device sends trigger signaling to a first terminal device in the N terminal devices.

Specifically, the trigger signaling is used to trigger the first terminal device to send an SRS on one or more sounding reference signal resource sets in K sounding reference signal resource sets corresponding to the first terminal device. The trigger signaling may be further used to activate configuration information corresponding to the K sounding reference signal resource sets corresponding to the first terminal device. In other words, the trigger signaling may be further used to activate the one or more sounding reference signal resource sets in the K sounding reference signal resource sets corresponding to the first terminal device. The first terminal device may be one or more of the N terminal devices. When the first terminal devices are a plurality of terminal devices in the N terminal devices, the network device needs to separately send trigger signaling to the plurality of terminal devices in the N terminal devices. The trigger signaling may be a MAC CE or DCI. Which SRS resource set in the K SRS resource sets corresponding to each terminal device is triggered by using the trigger signaling is determined by the network device and indicated to the terminal device. When the sounding reference signal resource set is a semi-persistent sounding reference signal resource set, the trigger signaling may be a MAC CE. When the sounding reference signal resource set is an aperiodic sounding reference signal resource set, the trigger signaling may be DCI.

In an example, Table 3 is used as an example. The first terminal devices are three terminal devices: UE 1, UE 5, and UE 9. Sequence numbers of two sounding reference signal resource sets corresponding to UE 1 are 1 and 2, sequence numbers of two sounding reference signal resource sets corresponding to UE 5 are 1 and 6, and sequence numbers of two sounding reference signal resource sets corresponding to UE 9 are 8 and 4. The network device separately sends trigger signaling to UE 1, UE 5, and UE 9. The network device may include indication information in the trigger signaling sent to UE 1, where the indication information indicates to trigger the sounding reference signal resource set whose sequence number is 1 and that corresponds to UE 1. The network device may include indication information in the trigger signaling sent to UE 5, where the indication information indicates to trigger the sounding reference signal resource set whose sequence number is 6 and that corresponds to UE 5. The network device may include indication information in the trigger signaling sent to UE 9, where the indication information indicates to trigger the sounding reference signal resource set whose sequence number is 8 and that corresponds to UE 9. In addition to including the indication information in the trigger signaling, the network device may separately send the indication information to the terminal device. This is not limited herein.

Step S505: The first terminal device in the N terminal devices receives the trigger signaling from the network device.

Step S506: The first terminal device in the N terminal devices sends the SRS to the network device on one or more sounding reference signal resource sets in the K sounding reference signal resource sets corresponding to the first terminal device.

Specifically, when the sounding reference signal resource set is a semi-persistent sounding reference signal resource set, and the trigger signaling is a MAC CE, the first terminal device may periodically send the SRS to the network device, and the periodicity may be determined based on the foregoing configuration information. When the sounding reference signal resource set is an aperiodic sounding reference signal resource set, and the trigger signaling is DCI, the first terminal device sends the SRS to the network device once.

In an example, Table 3 is used as an example. The first terminal devices are three terminal devices: UE 1, UE 5, and UE 9. Sequence numbers of two sounding reference signal resource sets corresponding to UE 1 are 1 and 2, sequence numbers of two sounding reference signal resource sets corresponding to UE 5 are 1 and 6, and sequence numbers of two sounding reference signal resource sets corresponding to UE 9 are 8 and 4. The network device separately sends trigger signaling to UE 1, UE 5, and UE 9. In addition, the network device may include indication information in the trigger signaling sent to UE 1, where the indication information indicates to trigger the sounding reference signal resource set whose sequence number is 1 and that corresponds to UE 1. The network device may include indication information in the trigger signaling sent to UE 5, where the indication information indicates to trigger the sounding reference signal resource set whose sequence number is 6 and that corresponds to UE 5. The network device may include indication information in the trigger signaling sent to UE 9, where the indication information indicates to trigger the sounding reference signal resource set whose sequence number is 8 and that corresponds to UE 9. After receiving the trigger signaling, UE 1 may send an SRS to the network device on the sounding reference signal resource set whose sequence number is 1. After receiving the trigger signaling, UE 5 may send an SRS to the network device on the sounding reference signal resource set whose sequence number is 6. After receiving the trigger signaling, UE 9 may send an SRS to the network device on the sounding reference signal resource set whose sequence number is 8.

Step S507: The network device receives the SRS from the terminal device.

Specifically, the network device may estimate an uplink/downlink channel coefficient based on the SRS, and determine an uplink/downlink precoding matrix.

In the method described in FIG. 5, the at least X sounding reference signal resource sets in the corresponding K sounding reference signal resource sets are different between any two of the N terminal devices. This can ensure that when simultaneously triggering sounding reference signals, a plurality of terminal devices may select and trigger different sounding reference signal resource sets to send SRSs to the network device, to ensure that the triggering is successful. Any two sounding reference signal resource sets in the M sounding reference signal resource sets are configured for the same quantity of times, or the difference between the quantities of configuration times of any two sounding reference signal resource sets is less than or equal to 1. This can avoid a case in which a sounding reference signal resource set is configured for an excessive quantity of times, and reduce a probability of a triggering failure.

The methods in embodiments of this application are described in detail above. Apparatuses in embodiments of this application are provided below.

Figure 6:
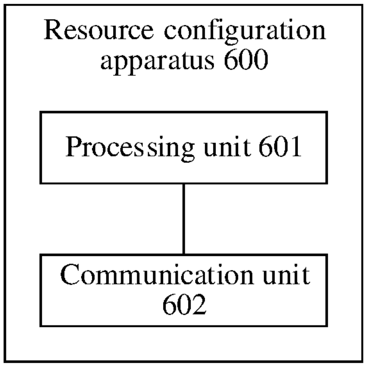
FIG. 6 is a schematic diagram of a structure of a resource configuration apparatus according to an embodiment of this application.

FIG. 6 is a schematic diagram of a structure of a resource configuration apparatus 600 according to an embodiment of this application. The resource configuration apparatus may include a processing unit 601 and a communication unit 602. Detailed descriptions of the units are as follows.

The processing unit 601 is configured to determine K sounding reference signal resource sets corresponding to each of N terminal devices in a first cell, where K sounding reference signal resource sets corresponding to any one of the N terminal devices belong to M sounding reference signal resource sets, and at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1.

The communication unit 602 is configured to send configuration information to each terminal device, where the configuration information indicates the K sounding reference signal resource sets.

In a possible implementation, any two sounding reference signal resource sets in the M sounding reference signal resource sets are configured for a same quantity of times, or a difference between quantities of configuration times of any two sounding reference signal resource sets is less than or equal to 1.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$C_M^K$ represents a combinatorial number of M and K.

In another possible implementation, the communication unit 602 is further configured to send trigger signaling to a first terminal device in the N terminal devices, where the trigger signaling is used to trigger the first terminal device to send a sounding reference signal SRS on one or more sounding reference signal resource sets in K sounding reference signal resource sets corresponding to the first terminal device. The communication unit 602 is further configured to receive the SRS from the first terminal device.

It should be noted that, for implementations and beneficial effects of the units, refer to corresponding descriptions in the method embodiment shown in FIG. 5.

FIG. 6 is a schematic diagram of a structure of a resource configuration apparatus 600 according to an embodiment of this application. The resource configuration apparatus may include a processing unit 601 and a communication unit 602. Detailed descriptions of the units are as follows.

The communication unit 602 is configured to receive configuration information from a network device, where the configuration information indicates K sounding reference signal resource sets, the apparatus is one of N apparatuses in a first cell, K sounding reference signal resource sets corresponding to any one of the N apparatuses belong to M sounding reference signal resource sets, and the K sounding reference signal resource sets meet the following condition: at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1.

The communication unit 602 is configured to send a sounding reference signal SRS to the network device on one or more sounding reference signal resource sets in the K sounding reference signal resource sets.

In a possible implementation, the K sounding reference signal resource sets further meet the following condition: any two sounding reference signal resource sets in the M sounding reference signal resource sets are configured for a same quantity of times, or a difference between quantities of configuration times of any two sounding reference signal resource sets is less than or equal to 1.

In a possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$C_M^K$ represents a combinatorial number of M and K.

In another possible implementation, the communication unit 602 is further configured to receive trigger signaling from the network device, where the trigger signaling is used to trigger sending of the SRS on one or more sounding reference signal resource sets in the K sounding reference signal resource sets.

It should be noted that, for implementations and beneficial effects of the units, refer to corresponding descriptions in the method embodiment shown in FIG. 5.

Figure 7:
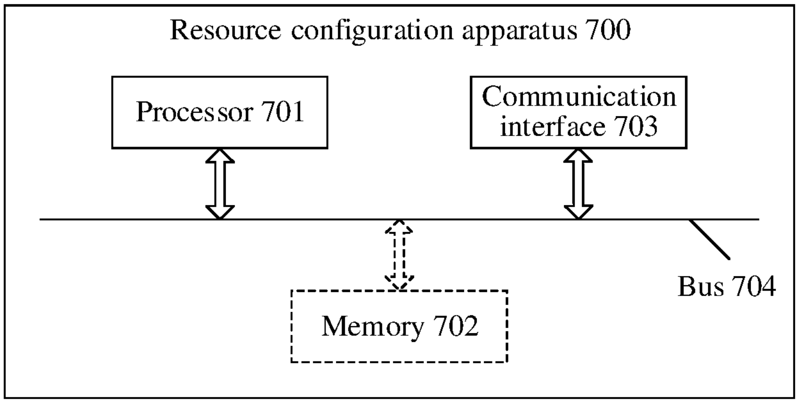
FIG. 7 is a schematic diagram of a structure of a resource configuration apparatus according to an embodiment of this application.

FIG. 7 shows a resource configuration apparatus 700 according to an embodiment of this application. The apparatus 700 includes at least one processor 701 and a communication interface 703. Optionally, the apparatus 700 further includes a memory 702. The processor 701, the memory 702, and the communication interface 703 are connected to each other through a bus 704.

The memory 702 includes, but is not limited to, a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 702 is configured to store a related computer program and data. The communication interface 703 is configured to receive and send data.

The processor 701 may be one or more central processing units (central processing units, CPUs). When the processor 701 is one CPU, the CPU may be a single-core CPU or a multi-core CPU.

The processor 701 in the apparatus 700 is configured to read computer program code stored in the memory 702, to perform the following operations: determining K sounding reference signal resource sets corresponding to each of N terminal devices in a first cell, where K sounding reference signal resource sets corresponding to any one of the N terminal devices belong to M sounding reference signal resource sets, and at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1; and sending configuration information to each terminal device through the communication interface 703, where the configuration information indicates the K sounding reference signal resource sets.

In a possible implementation, any two sounding reference signal resource sets in the M sounding reference signal resource sets are configured for a same quantity of times, or a difference between quantities of configuration times of any two sounding reference signal resource sets is less than or equal to 1.

In another possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$C_M^K$ represents a combinatorial number of M and K.

In another possible implementation, the processor 701 is further configured to: send trigger signaling to a first terminal device in the N terminal devices through the communication interface 703, where the trigger signaling is used to trigger the first terminal device to send a sounding reference signal SRS on one or more sounding reference signal resource sets in K sounding reference signal resource sets corresponding to the first terminal device; and receive the SRS from the first terminal device through the communication interface 703.

It should be noted that, for implementations and beneficial effects of the operations, refer to corresponding descriptions in the method embodiment shown in FIG. 5.

FIG. 7 shows a resource configuration apparatus 700 according to an embodiment of this application. The apparatus 700 includes at least one processor 701 and a communication interface 703. Optionally, the apparatus 700 further includes a memory 702. The processor 701, the memory 702, and the communication interface 703 are connected to each other through a bus 704.

The memory 702 includes, but is not limited to, a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 702 is configured to store a related computer program and data. The communication interface 703 is configured to receive and send data.

The processor 701 may be one or more central processing units (central processing units, CPUs). When the processor 701 is one CPU, the CPU may be a single-core CPU or a multi-core CPU.

The processor 701 in the apparatus 700 is configured to read computer program code stored in the memory 702, to perform the following operations: receiving configuration information from a network device through the communication interface 703, where the configuration information indicates K sounding reference signal resource sets, the apparatus is one of N apparatuses in a first cell, K sounding reference signal resource sets corresponding to any one of the N apparatuses belong to M sounding reference signal resource sets, and the K sounding reference signal resource sets meet the following condition: at least X sounding reference signal resource sets in corresponding K sounding reference signal resource sets are different between any two of the N terminal devices, where M is less than N, K is less than M, M, N, and K are all integers greater than or equal to 0, and X is an integer greater than or equal to 1; and sending a sounding reference signal SRS to the network device on one or more sounding reference signal resource sets in the K sounding reference signal resource sets through the communication interface 703.

In a possible implementation, the K sounding reference signal resource sets further meet the following condition: any two sounding reference signal resource sets in the M sounding reference signal resource sets are configured for a same quantity of times, or a difference between quantities of configuration times of any two sounding reference signal resource sets is less than or equal to 1.

In a possible implementation, the sounding reference signal resource set includes a semi-persistent sounding reference signal resource set or an aperiodic sounding reference signal resource set.

In another possible implementation, X and K meet the following relationship: X=K−1.

In another possible implementation, M, K, and N meet the following relationship:

$$C_M^K \geq N$$

$C_M^K$ represents a combinatorial number of M and K.

In another possible implementation, the processor 701 is further configured to receive trigger signaling from the network device through the communication interface 703, where the trigger signaling indicates to send the SRS on the K sounding reference signal resource sets.

It should be noted that, for implementations and beneficial effects of the operations, refer to corresponding descriptions in the method embodiment shown in FIG. 5.

It can be understood that the processor in embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor or any regular processor.

The method steps in embodiments of this application may be implemented by hardware, or may be implemented by a processor executing software instructions. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, the storage medium is coupled to the processor, so that the processor can read information from the storage medium and write information into the storage medium. Certainly, the storage medium may be a component of the processor. The processor and the storage medium may be located in an ASIC. In addition, the ASIC may be located in a base station or a terminal. Certainly, the processor and the storage medium may alternatively exist in the base station or the terminal as discrete components.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs or instructions. When the computer programs or instructions are loaded and executed on a computer, all or some of the procedures or the functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; may be an optical medium, for example, a digital video disc; or may be a semiconductor medium, for example, a solid state disk. The computer-readable storage medium may be a volatile or nonvolatile storage medium, or may include two types of storage media: a volatile storage medium and a non-volatile storage medium.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A method, comprising:

determining, by a network device, respective K sounding reference signal resource sets that are allocated to each terminal device of N terminal devices in a first cell, wherein the respective K sounding reference signal resource sets allocated to any one of the N terminal devices are included in a plurality of M sounding reference signal resource sets, at least X sounding reference signal resource sets in corresponding K sounding reference signal resource sets are different between any two of the N terminal devices that comprise a first terminal device and a second terminal device, first K sounding reference signal resource sets are allocated to the first terminal device, second K sounding reference signal resource sets are allocated to the second terminal device, the first K sounding reference signal resource sets comprise the at least X sounding reference signal resource sets different from the second K sounding reference signal resource sets, wherein M is less than N, K is less than M, M, N, and K are all integers greater than or equal to 0, and X is an integer greater than or equal to 1; and sending, by the network device, configuration information to each terminal device of the N terminal devices, wherein the configuration information indicates the respective K sounding reference signal resource sets allocated to each terminal device of the N terminal devices.

2. The method according to claim 1, wherein any two sounding reference signal resource sets in the plurality of M sounding reference signal resource sets are configured for a same quantity of times, or a difference between quantities of configuration times of any two sounding reference signal resource sets is less than or equal to 1.

3. The method according to claim 1, wherein each sounding reference signal resource set of the respective K sounding reference signal resource sets comprises a semi-persistent sounding reference signal resource set or an aperiodic sounding reference signal resource set.

4. The method according to claim 1, wherein X and K meet the following relationship: X=K−1.

5. The method according to claim 1, wherein M, K, and N meet the following relationship:

$$C_M^K \geq N,$$

wherein $$C_M^K$$

represents a combinatorial number of M and K.

6. The method according to claim 1, wherein the method further comprises:

sending, by the network device, trigger signaling to the first terminal device of the N terminal devices, wherein the trigger signaling triggers the first terminal device to send a sounding reference signal on one or more sounding reference signal resource sets in the first K sounding reference signal resource sets allocated to the first terminal device; and receiving, by the network device, the sounding reference signal from the first terminal device.

7. A method, comprising:

receiving, by a terminal device, configuration information from a network device, wherein the configuration information indicates K sounding reference signal resource sets corresponding to the terminal device, the terminal device is one of N terminal devices in a first cell, respective K sounding reference signal resource sets allocated to any one of the N terminal devices are included in a plurality of M sounding reference signal resource sets, and the respective K sounding reference signal resource sets meet the following condition: at least X sounding reference signal resource sets in corresponding K sounding reference signal resource sets are different between any two of the N terminal devices that comprise a first terminal device and a second terminal device, first K sounding reference signal resource sets are allocated to the first terminal device, second K sounding reference signal resource sets are allocated to the second terminal device, the first K sounding reference signal resource sets comprise the at least X sounding reference signal resource sets different from the second K sounding reference signal resource sets, wherein M is less than N, K is less than M, M, N, and K are all integers greater than or equal to 0, and X is an integer greater than or equal to 1; and sending, by the terminal device, a sounding reference signal to the network device on one or more sounding reference signal resource sets in the K sounding reference signal resource sets allocated to the terminal device.

8. The method according to claim 7, wherein the K sounding reference signal resource sets further meet the following condition: any two sounding reference signal resource sets in the plurality of M sounding reference signal resource sets are configured for a same quantity of times, or a difference between quantities of configuration times of any two sounding reference signal resource sets is less than or equal to 1.

9. The method according to claim 7, wherein each sounding reference signal resource set of the respective K sounding reference signal resource sets comprises a semi-persistent sounding reference signal resource set or an aperiodic sounding reference signal resource set.

10. The method according to claim 7, wherein X and K meet the following relationship:

$$X=K-1.$$

11. The method according to claim 7, wherein M, K, and N meet the following relationship:

$$C_M^K \geq N,$$

wherein $$C_M^K$$

represents a combinatorial number of M and K.

12. The method according to claim 7, wherein the method further comprises:

receiving, by the terminal device, trigger signaling from the network device, wherein the trigger signaling triggers sending of the sounding reference signal on the one or more sounding reference signal resource sets in the K sounding reference signal resource sets allocated to the terminal device.

13. An apparatus, comprising:

one or more processors; and one or more memories coupled to the one or more processors and storing programming instructions for execution by the one or more processors to cause the apparatus to perform a method comprising:

determining, by a network device, respective K sounding reference signal resource sets allocated to each terminal device of N terminal devices in a first cell, wherein the respective K sounding reference signal resource sets allocated to any one of the N terminal devices are included in a plurality of M sounding reference signal resource sets, at least X sounding reference signal resource sets in corresponding K sounding reference signal resource sets are different between any two of the N terminal devices that comprise a first terminal device and a second terminal device, first K sounding reference signal resource sets are allocated to the first terminal device, second K sounding reference signal resource sets are allocated to the second terminal device, the first K sounding reference signal resource sets comprise the at least X sounding reference signal resource sets different from the second K sounding reference signal resource sets, wherein M is less than N, K is less than M, M, N, and K are all integers greater than or equal to 0, and X is an integer greater than or equal to 1; and sending, by the network device, configuration information to each terminal device of the N terminal devices, wherein the configuration information indicates the respective K sounding reference signal resource sets allocated to each terminal device of the N terminal devices.

14. The apparatus according to claim 13, wherein any two sounding reference signal resource sets in the plurality of M sounding reference signal resource sets are configured for a same quantity of times, or a difference between quantities of configuration times of any two sounding reference signal resource sets is less than or equal to 1.

15. The apparatus according to claim 13, wherein each sounding reference signal resource set of the respective K sounding reference signal resource sets comprises a semi-persistent sounding reference signal resource set or an aperiodic sounding reference signal resource set.

16. The apparatus according to claim 13, wherein X and K meet the following relationship:

$$X=K-1.$$

17. The apparatus according to claim 13, wherein M, K, and N meet the following relationship:

$$C_M^K \geq N,$$

wherein $$C_M^K$$

represents a combinatorial number of M and K.

18. The apparatus according to claim 13, wherein the method further comprises:

sending, by the network device, trigger signaling to the first terminal device of the N terminal devices, wherein the trigger signaling triggers the first terminal device to send a sounding reference signal on one or more sounding reference signal resource sets in respective K sounding reference signal resource sets corresponding to the first terminal device; and receiving, by the network device, the sounding reference signal from the first terminal device.

* * * * *